(12) United States Patent
Sokabe et al.

(10) Patent No.: US 6,838,167 B2
(45) Date of Patent: Jan. 4, 2005

(54) PRINTING AND COPYING PAPER

(75) Inventors: Yoshifumi Sokabe, Tokyo-to (JP); Shin Nakashima, Nara-ken (JP)

(73) Assignees: Kokuyo Co., Ltd., Osaka (JP); Kisokaseisangyou Co., Ltd., Osaka (JP)

( * ) Notice: Subject to any disclaimer, the term of this patent is extended or adjusted under 35 U.S.C. 154(b) by 0 days.

(21) Appl. No.: 10/384,677

(22) Filed: Mar. 11, 2003

(65) Prior Publication Data

US 2004/0180191 A1 Sep. 16, 2004

(51) Int. Cl.[7] ............................................. D21H 19/56

(52) U.S. Cl. ................. 428/331; 428/476.1; 428/476.9; 428/483; 428/511; 428/512; 428/513

(58) Field of Search .............................. 428/331, 476.1, 428/476.9, 483, 511, 512, 513

(56) References Cited

U.S. PATENT DOCUMENTS 5,466,519 A * 11/1995 Shirakura et al. ........... 428/323

* cited by examiner

Primary Examiner—D. S. Nakarani
(74) Attorney, Agent, or Firm—Wenderoth, Lind & Ponack, L.L.P.

(57) ABSTRACT

A printing and copying paper capable of printing or copying images distinctly on a large scale, without becoming curled or being blocked up in or sent out of machines as two or more than two of the papers being superposed, by means of high temperature high speed printing or copying machines, in which toners are to be fixed at high temperature, comprising a sheet of paper, a white polyethylene coating layer coating on the surface of the paper, said layer being laminated with a transparent heat resistant resin coating layer, or a transparent heat resistant resin film to form a glossy surface, and a transparent polyethylene coating layer coating on the back surface of the paper, said layer being coated with a transparent heat resistant resin coating liquid which is mixed with matting agents.

4 Claims, 2 Drawing Sheets

PRINTING AND COPYING PAPER

BACKGROUND OF THE INVENTION

This invention relates to a printing and copying paper which is suitable for printing or copying images such as photographs taken by means of a digital camera, etc.

As to former printing and copying papers for printing or copying images of photographs which have been taken by means of a digital camera, glossy papers having the thickness of about 160 microns were used as a photographic paper for ink-jet printers. The glossy papers had defects of becoming curled or being blocked up in or sent out of machines as two or more than two of the papers being superposed, when the papers did print or copy images at the speed of about 100 papers per minute by means of high speed high temperature printing and copying machines such as a laser printer, etc., in which toners were fixed at the temperature of 150° C. to 200° C.

This invention aims to provide a printing and copying paper which will be free of the above-mentioned defects.

SUMMARY OF THE INVENTION

An object of the present invention is to provide a printing and copying paper which can print or copy images without becoming curled or being blocked up in or sent out of machines as two or more than two of the papers being superposed, by means of high temperature high speed printing or copying machines such as a laser printer, etc., which can print or copy images in large quantities at high speed, and in which toners are to be fixed at high temperature.

Another object of the present invention is to provide a printing and copying paper which is suitable for image processing in digital cameras, personal computers, etc.

To accomplish the above-mentioned objects, as shown in FIG. 1 of drawings, the printing and copying paper according to the present invention comprises a sheet of paper 10, a white polyethylene coating layer 21 coating on the front surface 11 of the paper 10, said layer being laminated with a transparent heat resistant resin coating layer 31, which is mixed with anti-static agents to form a glossy surface 311, and a transparent polyethylene coating layer 22 coating on the back surface 12 of the paper 10, said layer being coated with a transparent heat resistant resin coating layer 32, which is mixed with matting agents 320 and anti-static agents, and the printing and copying paper is characterized in that the paper can print or copy images on a large scale without becoming curled or being blocked up in or sent out of machines as two or more than two of the papers being superposed, by means of high speed high temperature printing or copying machines such as a laser printer, etc., in which toners are to be fixed at high temperature.

Also, to accomplish the above-mentioned objects, as shown in FIG. 2 of drawings, the printing and copying paper according to the present invention comprises a sheet of paper 10B, a white polyethylene coating layer 21B coating on the front surface 11B of the paper 10B, said layer being fused laminated with a transparent heat resistant resin film 40B, which is coated with anti-static agents on its surface, to form a glossy surface 400B, and a transparent polyethylene coating layer 22B coating on the back surface 12B of the paper 10B, said layer being laminated with a transparent heat resistant resin coating layer 32B, which is mixed with matting agents 320B and anti-static agents to form a matt surface 321B, and the printing and copying paper is characterized in that the paper can print or copy images on a large scale without becoming curled or being blocked up in or sent out of machines as two or more than two of the papers being superposed, by means of high temperature high speed printing and copying machines, in which toners are to be fixed at high temperature.

In the present invention, well known paper can be used, and wood free paper, glossy paper, baryta paper, art paper, coated paper, cast coated paper, etc. which have the thickness of 100 to 200 microns are to be used.

In the present invention, polyethylene coating layers are made of melts of high density polyethylene, medium density polyethylene, low density polyethylene, mixtures of two or more than two of them or mixtures of polyethylene and polyolefin resins other than polyethylene, which melts coat on the surface of the paper. Preferably, the thickness of polyethylene coating layers is 10 to 30 microns.

In the invention, white polyethylene coating layers coat on the front surface of the paper, while transparent polyethylene coating layers coat on the back surface of the paper, so that it may be possible to judge which is front or back from the view sight.

In the invention, transparent heat resistant resin coating layers are formed on the surface of the paper so that the paper may print or copy images, and coating solutions or emulsions made of synthetic resins, for example, aminoalkyd resins, acylic resins, unsaturated polyester resins, polyamide resins, etc. which stand heat at the temperature of 150° C. to 200° C. or more than 200° C., are used, and the solutions or emulsions preferably coat the paper in thickness of less than 10 microns.

As to heat resistant resin films, all of well known heat resistant synthetic resin films, which stand heat at the temperature of 150° C. to 200° C. or more than 200° C., can be used, however, polyethyleneterephthalate film (hereinafter referred to as PET film.) having the thickness of less than 15 microns is preferably used.

As to matting agents, well known fine particles having the average diameter of less than 15 microns of synthetic resins, metals or inorganic materials are used. Matting agents are to be added to heat resistant synthetic resin coating liquids to form fine irregularity on the surface of the resin coating layers, so that the printing and copying paper may have a mat surface, and so that the printing and copying paper may be prevented from being blocked up in or sent out of printing or copying machines, as two or more than two of the papers being superposed, when the paper prints or copies images.

EXAMPLE 1

Figure 1:
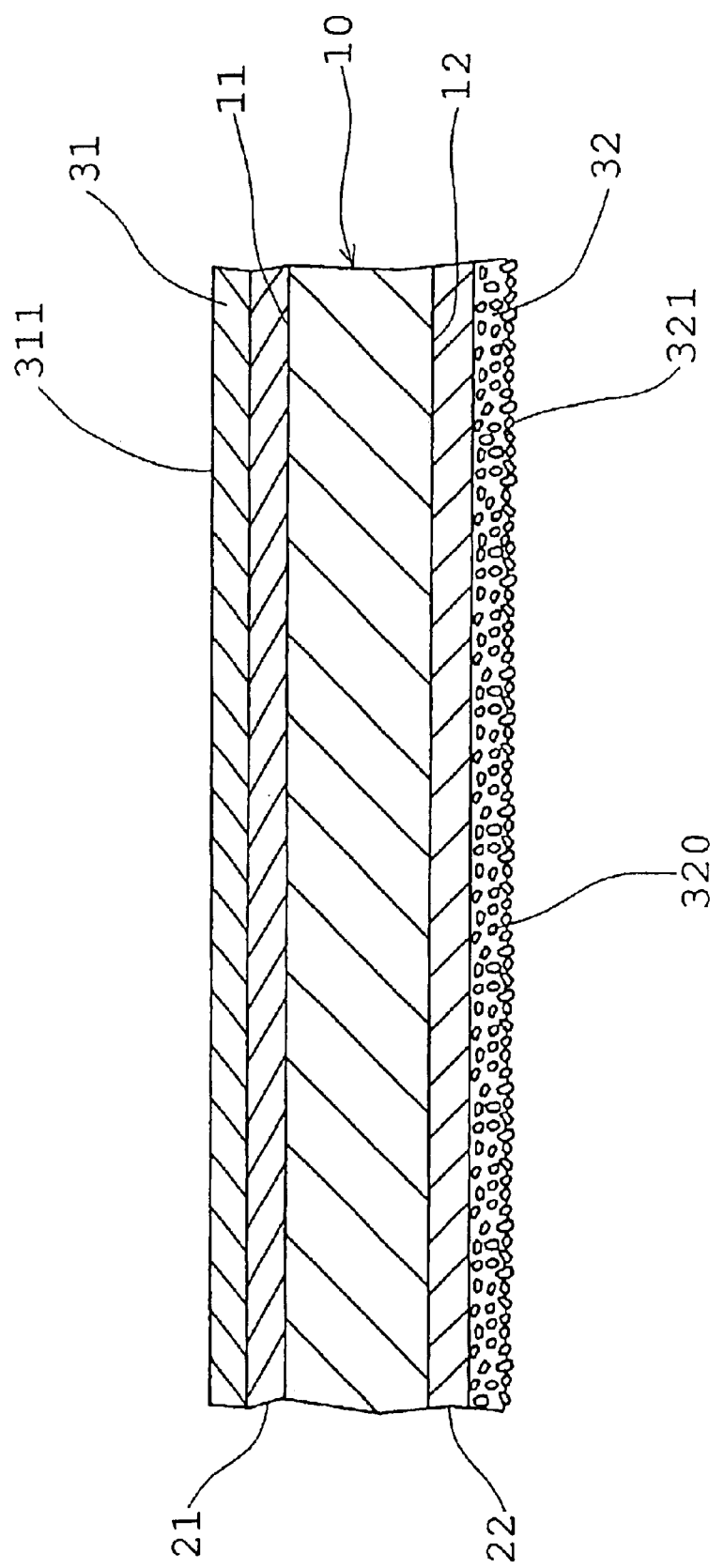
FIG. 1 is an enlarged schematic cross-sectional view of an example of the invention.

A printing and copying paper of example 1 according to the present invention is shown in FIG. 1.

The printing and copying paper comprises a sheet of baryta paper 10 having the thickness of 180 microns, a white high density polyethylene coating layer 21 coating on the front surface 11 of the paper 10 which is made of melts of white high density polyethylene, and which has the thickness of 25 microns, said layer being coated in thickness of 5 microns with a transparent heat resistant resin coating solution 31 which is made of a mixture of polyamide resin and cellulose nitrate, and which is mixed with a small quantity of well known anti-static agents, and a transparent high density polyethylene coating layer 22 coating on the back surface 12 of the paper 10 which is made of melts of transparent high density polyethylene, and which has the thickness of 15 microns, said layer being coated in thickness of 5 microns with a transparent heat resistant resin coating solution 32 which is made of a mixture of polyamide resin and cellulose nitrate, and which is mixed with 30% by weight of matting agents 320 comprising fine particles of silica having the average diameter of 2 microns and a small quantity of well known anti-static agents.

The printing and copying paper according to the invention never become curled nor change sizes due to humidity, when being kept in custody, because the surfaces 11 and 12 of the paper 10 are laminated with respective polyethylene coating layers 21 and 22.

Also, since the front surface of the paper is laminated with a white polyethylene coating layer 21, and since the white polyethylene coating layer 21 is coated with a transparent heat resistant synthetic resin coating solution 31 in thickness of 5 microns to form a glossy surface 311, the surface 311 which is to absorb inks of the coating solution layer 31 can become glossy.

Further, since the back surface 12 of the paper is laminated with a transparent polyethylene coating layer 22, and since the transparent polyethylene coating layer 22 is coated with a transparent heat resistant synthetic resin coating layer 32 which is mixed with matting agents 320 and anti-static agents, to form a mat surface 321, the paper can be prevented from being blocked up in or sent out of high speed printing or copying machines, as two or more than two of the papers being superposed, when the paper prints or copies images.

Furthermore, since the printing and copying paper has respective layers of heat resistant synthetic resin coating layers 31 and 32 on the front surface and the back surface, the paper never become curled due to heat of machines or mass production, and is prevented from being blocked up in or sent out of machines as two or more than two of the papers being superposed, when the paper prints or copies images by means of high temperature high speed printing or copying machines.

EXAMPLE 2

Figure 2:
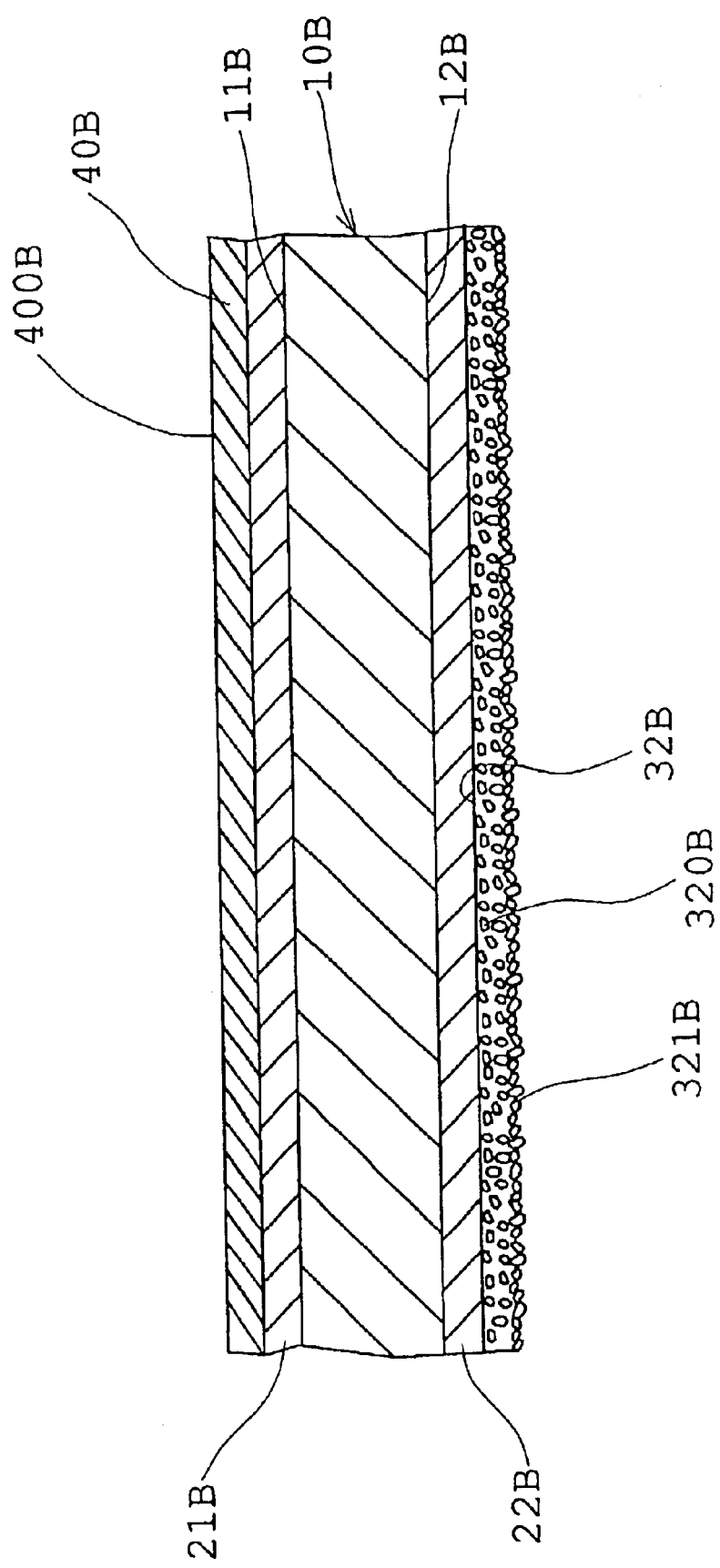
FIG. 2 is an enlarged schematic cross-sectional view of another example of the invention.

A printing and copying paper of example 2 according to the present invention is shown in FIG. 2.

The printing and copying paper comprises a sheet of wood free paper 10B having the thickness of 180 microns, a white high density polyethylene coating layer 21B coating on the front surface 11B of the paper 10B which is made of melts of white high density polyethylene, and which has the thickness of 25 microns, said layer being fused laminated with a transparent PET film 40B which has the thickness of 12 microns, and which is coated with a small quantity of well known anti-static agents on its surface 400B, and a transparent high density polyethylene coating layer 22B coating on the back surface 12B of the paper 10B which is made of melts of transparent high density polyethylene, and which has the thickness of 12 microns, said layer being coated with a heat resistant synthetic resin coating solution 32B which is made of unsaturated polyester resins, and which is mixed with a small quantity of a liquid of anti-static agents and 25% by weight of matting agents 320B comprising fine particles of silica having the average diameter of 3 microns.

Since the surfaces of the printing and copying paper are laminated with respective polyethylene coating layers 21B and 22B, the paper never become curled nor change sizes due to humidity, when being kept in custody.

Also, since the front surface of the printing and copying paper is laminated with a white polyethylene coating layer 21B, and since the white polyethylene coating layer 21B is laminated with a transparent PET film 40B, the surface 400B of the PET film which is to absorb inks can become glossy.

Further, since the back surface of the paper is laminated with a transparent polyethylene coating layer 21B, and since the transparent polyethylene coating layer 21B is coated with a heat resistant resin coating solution 32B, which is mixed with anti-static agents and matting agents 320B, the surface 321B of layer of heat resistant resin coating solution 32B can become mat, and the paper can be prevented from being blocked up in or sent out of high speed printing and copying machines, as two or more than two of the papers being superposed, when the paper prints or copies images.

Further, since the printing and copying paper has the front surface laminated with a heat resistant resin film 40B and the back surface laminated with a heat resistant resin coating layer 32B, the paper never become curled due to heat of machines or mass production, and the paper is prevented from being blocked up in or sent out of machines as two or more than two of the papers being superposed, when the paper is heated by heat which high temperature high speed printing or copying machines generate.

EFFECT OF THE INVENTION

The printing and copying paper according to the present invention can print or copy distinctly glossy images or mat images, without becoming curled or being blocked up in or sent out of machines as two or more than two of the papers being superposed, in large quantities at high speed by means of high temperature high speed printing or copying machines such as a laser printer, etc.

We claim:

1. A printing and copying paper comprising a sheet of paper, a white polyethylene coating layer on the front surface of the paper, said layer being laminated with a transparent heat resistant coating layer which comprises a mixture of polyamide resin, cellulose nitrate and an anti-static agent and which has a glossy surface and heat resisting property of at least 150° C., and a transparent polyethylene coating layer on the back surface of the paper, said layer being laminated with a transparent heat resistant coating layer which comprises a mixture of polyamide resin, cellulose nitrate and an anti-static agent, which has heat resisting property of at least 150° C. and which is mixed with a matting agent comprising fine particles of silica, wherein the printing and copying paper can print or copy images on a large scale, without becoming curled or being blocked up in or discharged out of machines as two or more than two of the papers being superposed, by means of high temperature high speed printing or copying machines, in which toners are to be fixed at high temperature.

2. A printing and copying paper comprising a sheet of paper, a white polyethylene coating layer on the front surface of the paper, said layer being fused laminated with a transparent polyethylene terephthalate film having a glossy surface and a transparent polyethylene coating layer on the back surface of the paper, said layer being laminated with a transparent heat resistant coating layer which comprises a mixture of unsaturated polyester resin coating solution and an anti-static agent, which has heat resisting property of at least 150° C. and which is mixed with a matting agent comprising fine particles of silica, wherein the printing and copying paper can print or copy images on a large scale, without becoming curled or being blocked up in or discharged out of machines as two or more than two of the papers being superposed, by means of high temperature high speed printing or copying machines, in which toners are to be fixed at high temperature.

3. The printing and copying paper of claim 1, wherein the high temperature high speed printing or copying machine is a laser printer.

4. The printing and copying paper of claim 2, wherein the high temperature high speed printing or copying machine is a laser printer.

* * * * *